MARIO DI GIOVANNI
INVENTOR.

ATTORNEYS

Aug. 8, 1961   M. DI GIOVANNI   2,995,721
TRANSDUCER
Filed Sept. 22, 1958   3 Sheets-Sheet 2
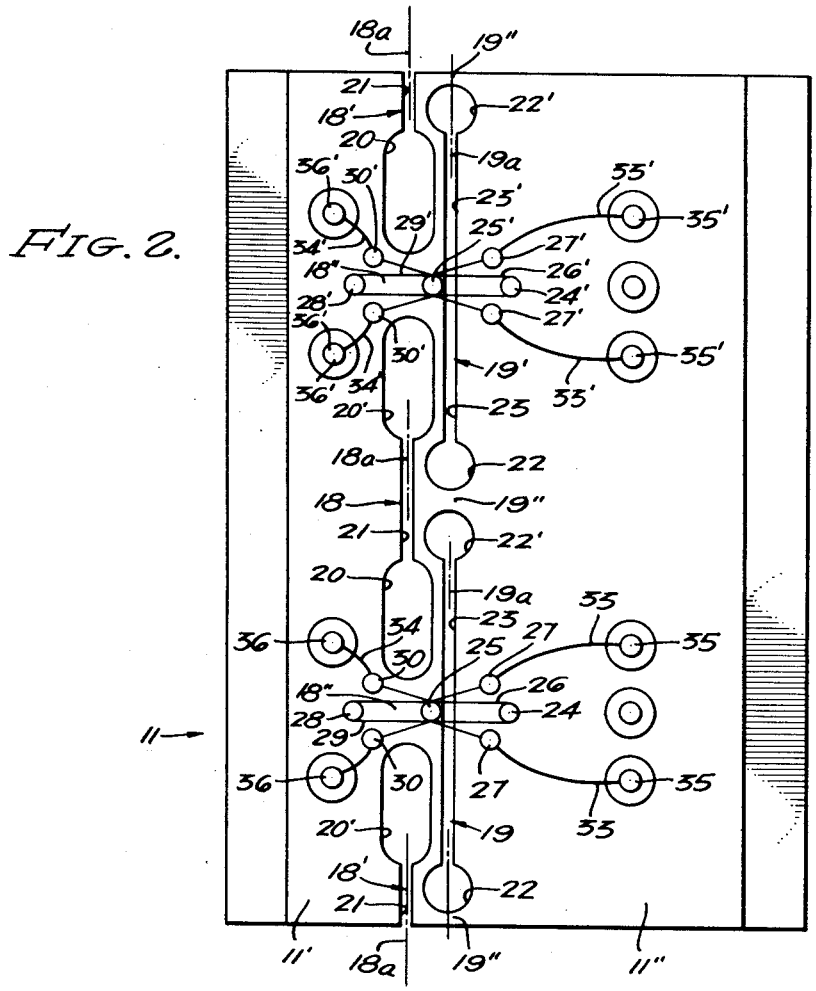
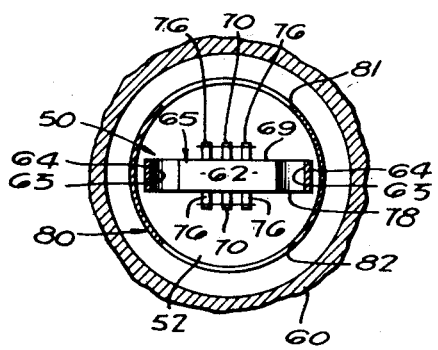
MARIO DiGIOVANNI
INVENTOR.
BY
ATTORNEYS Aug. 8, 1961  M. DI GIOVANNI  2,995,721
TRANSDUCER Filed Sept. 22, 1958  3 Sheets-Sheet 3

MARIO DI GIOVANNI
INVENTOR.

BY Philip Subkow
Max Geldin
ATTORNEYS

United States Patent Office 2,995,721
Patented Aug. 8, 1961

2,995,721
TRANSDUCER
Mario Di Giovanni, Pacific Palisades, Calif., assignor to Statham Instruments, Inc., Los Angeles, Calif., a corporation of California
Filed Sept. 22, 1958, Ser. No. 762,486
20 Claims. (Cl. 338—4)

This invention relates to a transducer capable of measuring force such as pressure or acceleration, or displacement, and is particularly concerned with a novel transducer structure having a number of improved characteristics.

Unbonded strain gauges are generally composed essentially of a strain sensitive wire connected to two supports which are subject to separation under an applied force. When subjected to tension or compression the wire changes in dimensions, and therefore changes in resistance. Means are provided for measuring the resulting change in resistance which is then translatable into a measurement of the applied force. Such gauges have found a wide application in industry.

An object of this invention is the provision of a novel transducer employing a wire whose resistance changes when it is subjected to variation in tension, and particularly to the unbonded type of such electrical resistance wire strain gauge transducer.

Another object is to provide a transducer having a novel combination of structural features permitting efficient measurement of force or displacement.

A still further object is to provide an instrument of the aforementioned type wherein the change in strain of the strain wire may be different from the change in strain of an elongated member to which the strain wire is connected, and wherein amplification of the strain in the wire is produced by a given displacement of the armature.

Another object is to provide an instrument which has minimum sensitivity to vibration. This is an important criterion where the transducer is employed in applications where the instrument is subject to substantial vibration.

Yet another object is to provide a transducer having substantially no lost motion, and wherein little or no resistance is imparted to oppose the movement of the movable or free pin to which the strain wire is connected.

It is yet another object to provide a transducer wherein the relatively movable pins have but a single degree of freedom axially of the elongated member or armature so that movement of the armature and movable pin is in a straight line parallel to the original extension of the wires between the pins.

Still another object is to provide an instrument of the above nature having overload protection for the strain wires.

The above and other objects are accomplished in a preferred embodiment by providing an instrument comprising a strain column and an armature preferably in the form of an elongated cylinder positioned about and connected to the strain column at spaced points axially of the column. The armature between said points is spaced radially of said column, and has a plurality of peripheral slots intermediate said spaced points of connection, the center line of said slots being in a plane or planes substantially normal to the axis of the strain column or armature. The slots are preferably symmetrically positioned about the periphery of the armature. Spaced wire connections or pins are mounted on the armature on opposite sides of said slots, there being preferably two sets of spaced pins in diametrically opposed positions on said armature. Strain wires are looped in tension between the spaced pins of each of said sets of pins.

Preferably two sets of aligned peripheral slots are employed, said sets of slots being positioned so that the center lines of each set of slots are in parallel planes and perpendicular to the armature axis, and being spaced a short distance from each other axially of the armature. Said sets of slots are staggered so that a metal portion of the armature between the aligned slots of one set of slots is positioned opposite a slot of the other aligned set of slots. The strain wires are preferably stretched in tension on pins positioned across a slot of one set of slots and an adjacent metal portion between the aligned slots of the adjacent set of slots. In accordance with this construction one pin adjacent the slot is movable with the end portion of the armature on which it is mounted, and the other pin positioned on the metal portion of the armature between the slots of the adjacent sets of slots remains fixed.

A force summing means or force collector, for example, in the form of a diaphragm and an associated piston, are connected to an end of the strain column. When a force or pressure is applied to the force collector and transmitted to the strain column, the latter is compressed or elongated, producing a corresponding displacement of the armature and the strain wires carried by the pins on the armature. In a preferred embodiment, the strain column is compressed on the application of such force. The result is a change in strain of the strain wires, producing an output from a bridge circuit, in which the strain wires are connected, proportional to the force or the displacement of the strain column.

The length of the strain wires between the pins is substantially less than the length of the strain column and of the armature, although both of the latter members between their points of connection have the same overall displacement. Hence the percentage variation in the length of the strain wire will be greater than the corresponding percentage variation in length of the strain column or armature between said points. As result of this difference in length variation between the strain wire and armature, the change in strain of the wire due to the compression or stretching of the strain column and armature is amplified, producing a corresponding amplication of output from the bridge circuit in which the strain wire is connected.

Further, due to the slotted construction of the armature, essentially all of the force applied to the force collector is transmitted and applied for displacement of the strain column, and only a minor portion of such force is required to cause displacement of the armature. In other words, the slotted structure of the armature offers a minimum resistance to axial displacement thereof upon a corresponding displacement of the strain column. This increases the accuracy and effectiveness of the instrument.

It has also been observed that the transducer of the invention, including the peripherally slotted armature with the wire connections disposed axially across the slots, has a minimum sensitivity to vibrations as compared to prior art devices.

In the preferred form of device, according to the invention, the preferably cylindrical armature on one side of the peripheral slots remains relatively fixed, while the armature portion on the other side of said slots is movable. By properly arranging two strain wires in axial alignment on the pins across the slots, one of the strain wires connected to the pins on the relatively fixed armature portion has a fixed tension during displacement of the strain column, and the other strain wire connected to the pin on the relatively movable portion of the armature changes in tension on displacement of the strain column. When arranged in a bridge circuit, the fixed tension wire constitutes the inactive arm of the bridge, while the strain wire whose tension changes is the active arm of the bridge. This change is preferably in the nature of a relaxation of the strain wire on application of a force to the strain column. By thus placing the maximum tension on the latter strain wire when it is wound, and since any change in tension is in the nature of a decrease in the original tension, the strain wire in the active arm of my transducer has automatic overload protection.

Also, by employing a slotted armature construction, according to the invention, the slotted portion of the armature is inflexible in a direction perpendicular to the motion of the movable portion of the armature on one side of the peripheral slots, but is flexible in a direction parallel to the motion of the movable armature portion. This is because such slotted portion of the armature has only one degree of freedom, i.e., on the axis of the armature, and is relatively rigid in any plane perpendicular to the axis. This property of the slotted portion of the armature constrains the motion of the movable portion of the armature to the axis of said armature. By positioning the movable, i.e., free, pins on the movable portion of the armature on one side of the slotted portion of the armature, and positioning the stationary pins on the immovable portion of the armature on the other side of said slotted portion, and by winding the wires on the supporting pins so that the wires are parallel to the axis of the armature, the movement of the armature will cause the free pins to move in a direction parallel to the original extension of the wires. This produces an alteration in strain in the wires which results in a linear variation in tension with no substantial imposition of any bending in the wires.

The invention will be further described in connection with the accompanying drawing, wherein:

FIG. 2 is a layout of the cylindrical armature of the device of FIG. 1, showing the arrangement of the slots in the armature and the location of the wire supporting pins on the armature.

FIG. 5 is a section taken on line 5—5 of FIG. 3.

Figure 1:
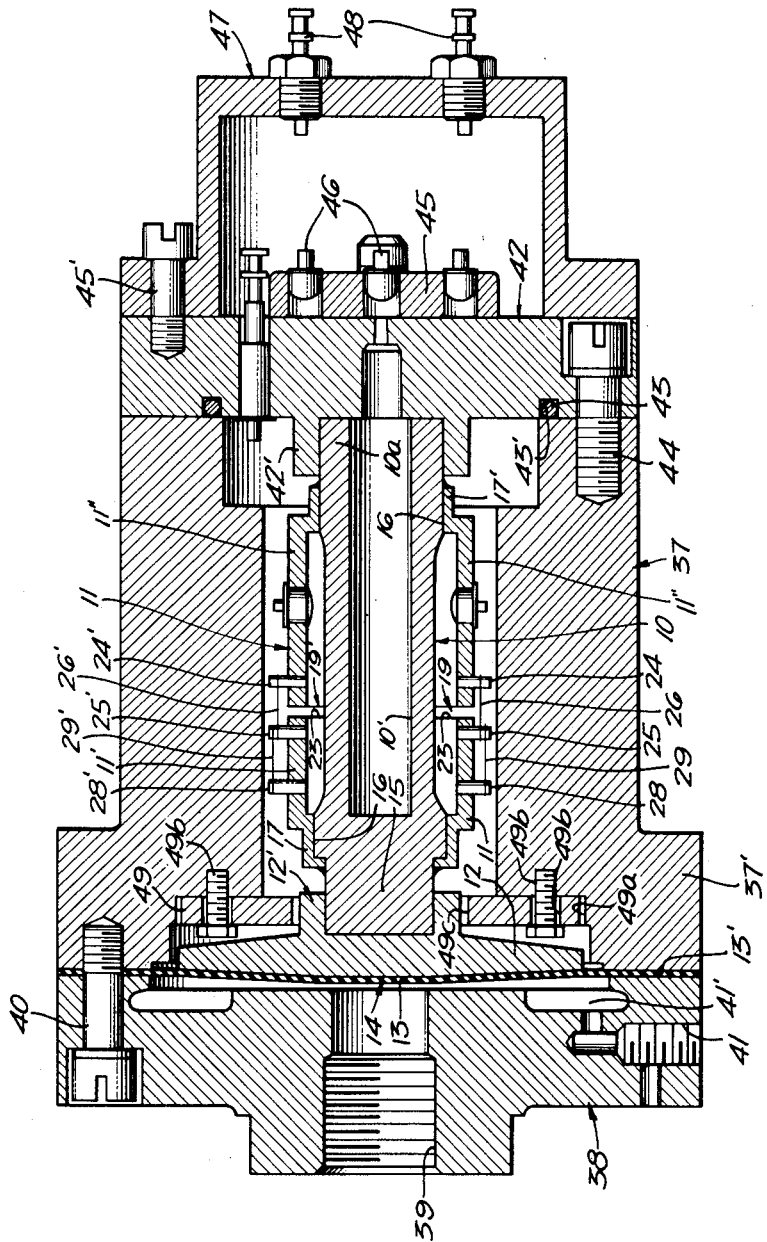
FIG. 1 is a longitudinal sectional view of a preferred embodiment of the invention.

Referring to the drawings, the instrument is composed of a strain column 10 which is of elongated cylindrical shape and which is hollow along its major portion, as indicated at 10'. About the strain column is positioned a cylindrical armature 11 which is mounted on the strain column at the ends of the armature. On one end of the strain column is positioned an integral block portion 15 on which is mounted a piston 12, the piston having a flange 12' which is fastened, for example, by force fitting or by brazing, about the end block 15 of the strain column. Connected to the outer face of the piston 12 by suitable means such as brazing is a diaphragm 13, the outer periphery 13' of the diaphragm being clamped between the case 37 and pressure head 38. The piston 12 and diaphragm 13 together constitute a force collector or force summing means which transmits an applied force to the strain column.

The cylindrical armature 11 has flanges 17 and 17' integrally connected to the opposite ends of the armature, and such flanges are connected as by welding to the opposite shoulders 16 on the outer surface of the strain column 10. Referring particularly to FIG. 2, showing a flat development of the cylindrical armature, it will be noted that along the left portion of the cylindrical armature 11 is formed a pair of slots 18 and 18' which are disposed in alignment about the periphery of the cylinder, the center line 18a of said slots being in a plane perpendicular to the axis of the cylindrical armature. A second pair of slots 19 and 19' is also formed in the cylinder closely adjacent to slots 18 and 18' and parallel thereto about the periphery of the armature cylinder, the center line 19a of slots 19 and 19' being in a second plane perpendicular to the axis of the armature. The slots 18 and 18' are each formed of two enlarged end portions 20 and 20' connected by a central narrow portion 21. The two slots 18 and 18' are formed symmetrically about the cylindrical armature and disposed diametrically of each other about the cylinder. It is noted that between the slots 18 and 18' is a metal portion 18".

It will be seen that slots 19 and 19' are staggered with respect to slots 18 and 18' so that the narrow central elongated portion 23 and 23' of slots 19 and 19' are each disposed opposite two of the enlarged portions 20 and 20' of adjacent slots 18 and 18', and the slots 19 and 19' each have circular end portions 22 and 22' which are disposed opposite the narrow central portion 21 of the slots 18 and 18'. A small portion of metal 19" is positioned between the adjacent circular end portions 22 and 22' of the slots 19 and 19'.

From the foregoing structure it will be seen that slots 18, 18' and 19, 19' form a flexible connection between the two end portions 11' and 11" of the armature 11. Thus, when a force is applied against the force collector 14, causing the strain column 10 to be displaced, this produces a displacement of the armature 11 such that the two end portions 11' and 11" of the armature move with the portions of the strain column to which the flanges 17 and 17' are connected. However, when the strain column is compressed by the force collector 14, the left end of the strain column, viewing FIG. 1, is displaced more than the right end of the strain column, since the latter is fixed to the cap 42 and hence resists displacement by compression of the strain column. Hence the block portion 15 of the armature on displacement to the right carries with it the left portion 11' of the armature 11. Since the right portion of the armature is relatively fixed through its connection at flange 17' with the right end of the strain column, the portion 11' of the armature to the left of slots 18, 18' and 19, 19' will move toward the portion 11" of the armature to the right of said slots. Such relative displacement of the portions 11' and 11" of the armature is affected with minimum resistance to the force causing compression of the strain column, by reason of the above described slotted structure of the armature, presenting a minimum amount of solid metal, namely, metal portions 18" and 19", between the adjacent slots, for connecting together the two relatively movable armature portions 11' and 11". In effect the slotted portion of the armature provides a highly resilient connection between the end portions 11' and 11" of the armature. Also, due to the slotted structure of the armature, the flexure thereby formed is such that the end portions 11' and 11" of the armature move only axially of the armature and not in any other direction, such as perpendicular to the armature.

Mounted on the armature portion 11" adjacent the narrow central portion 23 of slot 19 is a pin 24, and disposed on armature portion 11' on the opposite side of the narrow portion 23 of slot 19 and closely adjacent slot 23 is a pin 25. Pins 24 and 25 are positioned parallel to the axis of the cylindrical armature and perpendicular to the slots 18 and 19. A strain wire 26 is mounted in tension on pins 24 and 25, the ends of the strain wire being connected to terminal pins 27. Another pin 28 is mounted on the end portion 11' of the armature adjacent the enlarged portions 20 and 20' of the pair of slots 18 and 18', pin 28 being spaced from pin 25. A strain wire 29 is looped in tension between pin 28 and pin 25, the ends of such strain wire being in turn connected to terminal pins 30. The pins 24, 25 and 28 are in axial alignment.

It will be noted that since pins 25 and 28 are both mounted on the solid metal portion 18" between the enlarged slot portions 20 and 20', and since such metal portion 18" forms a part of the armature portion 11', pins 25 and 28 are displaced the same amount on movement of armature portion 11', and hence no displacement takes place between pins 25 and 28 on displacement of the strain column 10 and the strain on strain wire 29 remains substantially constant. However, as to pins 24 and 25, since the narrow portion 23 of slot 19 separates these pins, and since end portions 11' and 11" of the armature move with respect to each other on application of a force to the strain column, the pins 24 and 25 will also be displaced with respect to each other, resulting in a change in strain of the strain wire 26. Terminals 27 are connected by leads 33 to the terminals 35 and the terminal pins 30 are connected by leads 34 to terminals 36.

In a similar manner as that described above, pins 24' and 25' are disposed on the opposite side of the narrow portion 23' of the slot 19' and a strain wire 26' is looped in tension between pins 24' and 25' and connected to terminals 27'. Also, a pin 28' is positioned on the opposite side of the slot 19' from pin 24' and a strain wire 29' is looped in tension between pins 25' and 28', the ends of the strain wire being connected to the terminal pins 30'. The pins 24', 25' and 28' and strain wires 26' and 29' are positioned in the same manner as the corresponding pins 24, 25 and 28, and strain wires 26 and 29, respectively, except in being disposed 180° and diametrically opposite the latter pins and strain wires on the cylindrical armature 11. Hence, pins 24', 25' and 28' are in parallel alignment with the axis of the armature and the strain wire 26' between pins 24' and 25' is displaced on displacement of the strain column so that wire 26' changes in resistance on displacement of said column and the armature; whereas the tension and resistance of strain wire 29' remains fixed since the pins 25' and 28' remain fixed with respect to each other on such displacement. Terminals 27' are connected by leads 33' to terminals 35' and the terminals 30' are connected by leads 34' to terminals 36'.

The transducer is mounted in a case 37 and a pressure head 38 is connected to one end of the case 37 by means of screws 40, the pressure head 38 and end flange 37' of case 37 clamping the force collector 14 in position. Pressure head 38 has an inlet 39 which communicates with the diaphragm 13 of the force collector. In the pressure head is a threaded bleed valve 41 which communicates via passages 41' with the space adjacent the diaphragm 13.

At the opposite end of the case 37 is mounted a cap 42 by means of the screws 44, there being a ring seal 43 disposed in a recess 43' between the case and the cap 42. The cap 42 carries an inwardly extending flange 42' which receives the end 10a of the strain column 10 and holds it in position by a force fit or by welding the engaging surfaces. It is thus seen that end 10a of the strain column remains fixed while the opposite end of 10 carrying block 15 is displaced relative to end 10a on application of a force to the strain column by the force collector 14.

A terminal plate 45 is mounted on the cap 42, and on said terminal plate are a number of terminals 46 to which are connected leads not shown which are attached to the terminals 35, 35' and 36, 36'. Mounted on the cap 42 by means of the screws 45' is a cover 47 having connected thereto external terminals 48.

The strain wires 26, 29, 26', and 29' are connected in a bridge circuit. The bridge circuit is of the two arm type, having one active arm and one inactive arm. The strain wires 26 and 26' are the active arms of the bridge and the strain wires 29 and 29' are the inactive arms of the bridge.

A stay plate 49 is mounted in a recess 49a of flange 37' by means of screws 49b. The stay plate 49 has a central aperture 49c which receives the flange 12' with sufficient clearance to permit axial motion of flange 12' but preventing any undue lateral motion thereof. Over-size holes 49d are provided for screws 49b to permit adjustment of the plate.

From the above, it will be seen that when a positive pressure is applied to the diaphragm 13, the strain column 10 will be displaced to the right as viewed in FIG. 1. This results in a compression of the strain column and also a compression of the armature 11 carried by the strain column. This produces a movement of armature portion 11' toward portion 11", and a relaxation and change in resistance of the strain wires 26, 26' occurs proportional to the force compressing the strain column.

It will be observed that the length of the strain column 10 and the length of the armature 11 are each substantially longer than the distance between pins 24 and 25 and between pins 24' and 25'. Thus, when the strain column 10 is compressed by an applied positive pressure against the diaphragm 13 the pins 24, 25 and 24', and 25' mounted on the armature are carried the same distance toward each other equal to such overall displacement of the strain column and armature. Since the distance or length of strain wire between the pins 24, 25, and 24', 25', respectively, is substantially less than the length of the strain column 10 and armature 11 mounted thereon, the percentage change of strain in strain wires 26 and 26' as result of such compression will be greater than the percentage change in displacement of the strain column resulting from compression in the strain column, in inverse proportion to these lengths. This means that the reduction in length of the strain column will produce a magnified reduction in strain in the strain wires 26 and 26'. Thus, where a relatively stiff strain column 10 is employed, say for measuring high pressures, the relatively small displacement of the strain column due to the applied pressure will be magnified in the resulting relaxation in strain of the strain wires 26 and 26' due to the mechanical advantage afforded, producing an instrument which can measure or sense pressures with improved sensitivity and accuracy.

It will be observed that any displacement of the strain column 10 will cause the cylindrical armature 11 to move in an axial direction, coaxial with the axis of the slotted portion or slots 18, 18' and 19, 19' of the armature. Therefore, on displacement of the strain column and of the cylindrical armature, the pins 24 and 25, and 24' and 25' move in but a single direction axially of the cylindrical armature with respect to each other. Since the strain wires 26 and 26' are mounted on the supporting pins so that the wires are parallel to the axis of the strain column and of the armature, movement of the armature will cause a movement or change in strain in such strain wires along the axis of these members. This results in an alteration in strain in the wires such that a variation in tension with no substantial imposition of any bending in the wires is produced and the structure is substantially symmetrical.

It is further noted that in the above described device the greatest strain on the strain wires 26 and 26', which are the active arms of the bridge, is imparted to the strain wires when they are first wound on the pins 24, 25 and 24' and 25'. Imposition of a force against the force collector 14 produces a relaxation of the strain wires 26, 26' as noted above and, hence, regardless of the force so applied and regardless as to the amount of displacement of the strain column and of the armature due to such force the strain wires 26 and 26' will always have, under these conditions, a strain which is less than that of the original tension on these wires. Hence, automatic overload protection is thus provided without the conventional use of stops and similar means ordinarily employed for this purpose.

It will, of course, be understood that the strain column and the armature may be other than cylindrical. Further, it should be recognized that the actual design of the slots forming the resilient connection between the two end portions 11' and 11" of the armature can be different from the slots described above and shown in the drawing. These slots also may be positioned at a different distance from the respective ends of the armature than shown and described above. Thus, if desired, the slotted portion of the armature may be located substantially equidistant from the opposite ends of the armature, so long as it functions as described above to produce the aforementioned results. Also, instead of one slotted portion formed by the two sets of slots 18, 18' and 19, 19', there may be employed two such slotted portions disposed near the opposite ends of the cylindrical armature.

It will also be noted that by increasing or decreasing the area of the piston 12 of the force collector, the range of the instrument can be varied. Thus, by increasing the area of the piston the range of the instrument is decreased, and by decreasing the piston area the range of the instrument can be increased.

Figure 3:
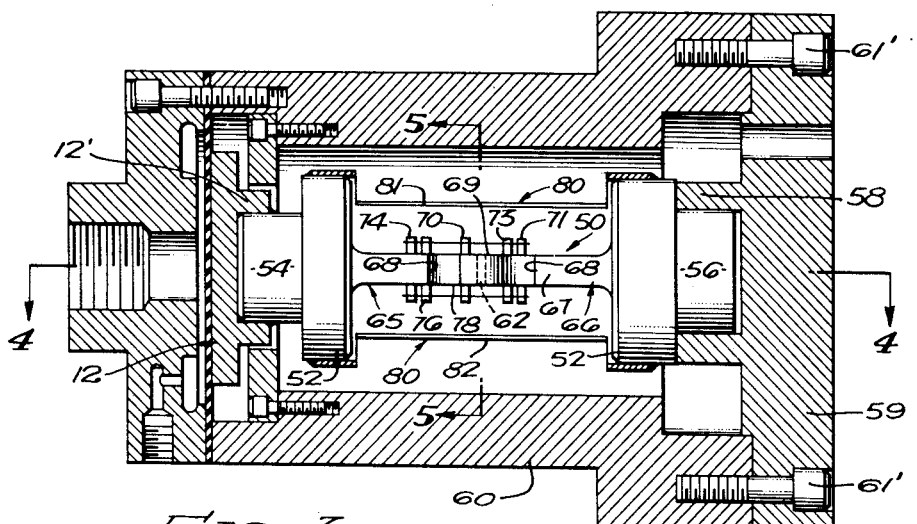
FIG. 3 is a sectional view, partly in elevation, illustrating a modification of the invention.
Figure 4:
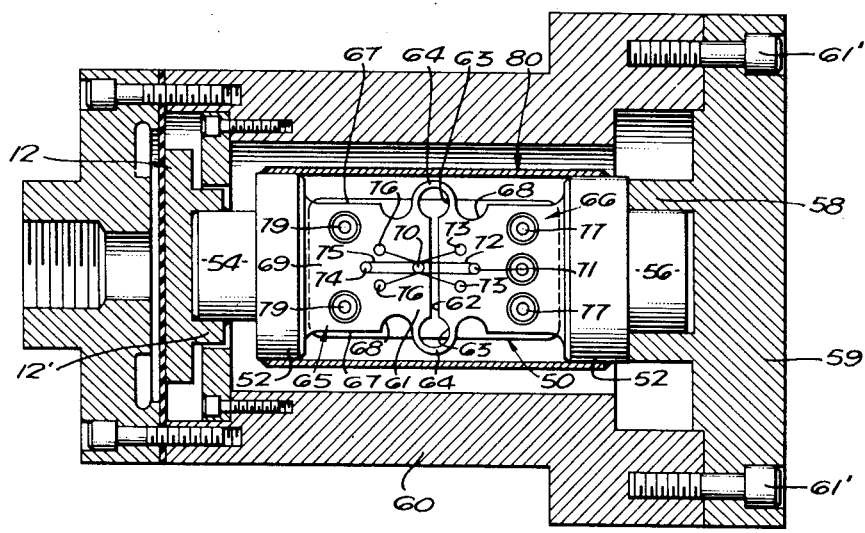
FIG. 4 is a section taken on line 4—4 of FIG. 3.

While I have described an instrument in which the armature is positioned about the elongated strain member or strain column, the instrument can be modified so that the armature is in the center and the elongated strain member, e.g., in the form of a tube, is positioned about the armature. FIGS. 3 and 4 show such a modification.

Referring to FIGS. 3, 4 and 5, an armature 50 in the form of a flat bar is integrally connected at its opposite ends to the central portion of a pair of end flanges 52. Block portion 54 connected to one flange 52 is connected as by welding to flange 12' of piston 12, and the opposite block portion 56 connected to the other flange 52 is mounted in a flange 58 carried by a head 59 connected to the case 60 by screws 61.

The armature 50 has a central slotted portion 61 having a central slot 62 which is positioned substantially normal to the longitudinal axis of the armature. At the opposite ends of slot 62 are formed enlarged apertures 63, leaving a narrow metal bridge 64 across the central slotted portion 61 of the armature and connecting the two opposite end portions 65 and 66 of armature 50. It will be noted that metal strips 64 extend outwardly from the adjacent longitudinal edges 67 of the armature, and notches 68 are formed in armature portions 65 and 66 adjacent the strips 64. Thus it will be seen that while slotted portion 61 of the armature permits axial displacement of one end portion 65 of the armature with respect to the other end portion 66, the provision of the outwardly extending metal strips 64 and the notches 68 provide stiffness in the armature adjacent its slotted portion to prevent lateral displacement of the armature portions 65 and 66.

Mounted on one face 69 of the armature portion 65 adjacent the narrow slot 62 is a pin 70, and disposed on armature portion 66 on the opposite side of slot 62 is a pin 71. A strain wire 72 is mounted in tension on pins 70 and 71, the ends of the strain wire being connected to terminal pins 73. Another pin 74 is mounted on face 69 of the end portion 65 of the armature and spaced from pin 70. A strain wire 75 is looped in tension between pin 70 and pin 74, the ends of the strain wire being connected to terminal pins 76. Pins 70, 71 and 74 are all positioned centrally of the armature on a line parallel to the longitudinal axis of the armature. Terminal pins 73 and 76 are in turn connected by leads (not shown) to terminals 77 and 79, respectively, on the armature. A like pin and strain wire arrangement is mounted on the opposite face 78 of the armature 50. The two pairs of strain wires on opposite faces of the armature are connected in a Wheatstone bridge arrangement, in a manner understood in the art.

Mounted on the outer periphery of the flanges 52, as by brazing, is a tube or shell 80, said tube being slotted longitudinally at 81 and 82 on opposite sides of the armature to provide access to the pins and strain wires on opposite faces of the armature 50. The instrument is designed so that the major portion of the strain resulting when a force is applied to piston 12 is taken by the tube 80, which aids in holding the end flanges 52 in axial alignment and in preventing twisting and lateral displacement of said flanges and of the armature. The armature, due to its flexible connection at the central slotted portion 61, follows the displacement of the flanges 52 and of the tube 80 while offering only minor resistance to such displacement, on imposition of a force against the piston 12.

It will be observed that when a force is applied to the right against piston 12, viewing FIG. 3, the left end portion 65 of the armature is displaced toward the right end portion 66 of the armature, which remains relatively fixed. During such displacement, strain wire 75 between pins 70 and 74 does not vary in tension, while the strain wire 72 between pins 70 and 71 is relaxed, since pins 70 tend to approach pins 71, whereas the distance between pins 70 and 74 remain fixed since these latter pins are located on the same end portion 65 of armature 50.

It will be further understood that instead of applying a force produced by fluid pressure to the strain column, I can connect a rod to an end of the strain column for measurement of forces applied directly to the rod by means other than fluid pressure, or the instrument can be employed as a linear accelerometer by attaching a mass to an end of the strain column for measuring acceleration along the axis of the strain column.

While I have described particular embodiments of my invention for the purpose of illustration, it should be understood that various modifications and adaptations thereof may be made within the spirit of the invention as set forth in the appended claims.

I claim:

1. A transducer which comprises a strain column, an armature positioned about said strain column, said armature being rigidly connected to said strain column at spaced points axially of said column, said armature between said spaced points being spaced radially of said column, a plurality of slots in said armature peripherally positioned about said armature between said spaced points, the center line of said slots being in a plane substantially normal to the axis of said armature, said slotted portion of said armature facilitating axial displacement of said armature on axial motion of said strain column, spaced wire connections on said armature disposed axially thereof on opposite sides of the slotted portion of said armature, an electrical resistance strain wire connected to said wire connections, and a force collector connected to said strain column.

2. A transducer as defined in claim 1, including a case disposed about said strain column, said armature and its associated structure, a rigid connection between one end of said strain column and said case, said force collector being connected to the other end of said strain column.

3. A transducer as defined in claim 1, including a force collector connected to each end of said strain column.

4. A pressure transducer as defined in claim 1, including a case disposed about said strain column, said armature and its associated structure, a rigid connection between one end of said strain column and said case, and wherein said force collector comprises a piston and a diaphragm mounted on a face of said piston, a fluid pressure inlet in said case communicating with said diaphragm, and a connection between said piston and the other end of said strain column.

5. A transducer which comprises a strain column, an armature positioned about said strain column, a plurality of rigid connections between said armature and said strain column, said connections being located at spaced points axially of said column, said armature between said spaced points being spaced radially of said column, a plurality of slots in said armature peripherally positioned about said armature between said spaced points, the center line of said slots being in a plane substantially normal to the axis of said armature, said slotted portion of said armature facilitating axial displacement of said armature on axial motion of said strain column, spaced wire connections on said armature disposed axially thereof on opposite sides of at least one of said slots, an electrical resistance strain wire connected to said wire connections, and a force collector connected to said strain column.

6. A transducer which comprises a strain column, a substantially cylindrical armature positioned about said strain column, rigid connections at opposite ends of said armature between said armature and said strain column and disposed axially of said column, said armature between said connections being spaced radially of said column, a plurality of slots peripherally positioned symmetrically about said armature between said connections, the center line of said slots being in a plane substantially normal to the axis of said armature, said slotted portion of said armature facilitating axial displacement of said armature on axial motion of said strain column, first spaced wire connections on said armature disposed axially thereof on opposite sides of one of said slots, an electrical resistance strain wire connected to said wire connections, second spaced wire connections on said armature disposed axially thereof on opposite sides of another of said slots, said second wire connections being disposed diametrically opposite said first wire connections, an electrical resistance strain wire connected to said second wire connections, and a force collector connected to said strain column.

7. A transducer which comprises an elongated strain column, a substantially cylindrical armature encircling said strain column, rigid connections between said armature and said strain column located at opposite ends of said armature, said armature between said connections being spaced radially from said strain column, said armature moving axially with said column in response to axial displacement thereof, a plurality of first aligned peripheral slots in said armature intermediate the ends thereof, a plurality of second aligned peripheral slots in said armature closely spaced from said first slots axially of said armature, the center line of said first slots and the center line of said second slots each being in a plane substantially normal to the axis of said armature, said second slots being staggered from said first slots, whereby a portion of the entire periphery of said armature is slotted and forming a resilient connection between opposite end portions of said armature, said slotted portion of said armature facilitating axial displacement of said armature on axial motion of said strain column, a first set of pins positioned axially on said armature on opposite sides of at least one of said first and second slots, a second pair of pins positioned axially on said armature on opposite sides of at least one of said first and second slots and substantially diametrically opposite said first pins, a first strain wire looped in tension between said first set of pins, a second strain wire looped in tension between said second pair of pins, and a force collector connected to an end of said strain column for application of an axial force to said strain column.

8. A transducer which comprises an elongated strain column, a substantially cylindrical armature encircling said strain column, connections between said armature and said strain column located at opposite ends of said armature, said armature between said connections being spaced radially from said strain column, said armature moving axially with said column in response to axial displacement thereof, a plurality of first aligned peripheral slots in said armature intermediate the ends thereof, a plurality of second aligned peripheral slots in said armature closely spaced from said first slots axially of said armature, the center line of said first slots and the center line of said second slots each being in a plane substantially normal to the axis of said armature, said second slots being staggered from said first slots, whereby a portion of the entire periphery of said armature is slotted, and forming a resilient connection between opposite end portions of said armature, a first set of pins positioned on opposite sides of said second slots, one of said first pins being located on said armature between adjacent first slots, a second pair of pins positioned on opposite sides of said second slots and substantially diametrically opposite said first pins, one of said second pins being located on said armature between adjacent first slots, a first strain wire looped in tension between said first set of pins, a second strain wire looped in tension between said second pair of pins, and a force collector connected to an end of said strain column for application of an axial force to said strain column.

9. A pressure transducer as defined in claim 8, including a case disposed about said strain column, said armature and its associated structure, a connection between one end of said strain column and said case and wherein said force collector comprises a piston and a diaphragm mounted on a face of said piston, a fluid pressure inlet in said case communicating with said diaphragm, and a connection between said piston and the other end of said strain column.

10. A transducer which comprises an elongated strain column, a substantially cylindrical metal armature encircling said strain column, connections between said armature and said strain column located at opposite ends of said armature, said armature between said connections being spaced radially from said strain column, said armature moving axially with said column in response to axial displacement thereof, a pair of first like slots peripherally disposed in alignment symmetrically about said armature intermediate the ends thereof, providing a pair of first diametrically opposed narrow bands of metal between the ends of said slots, a pair of second like slots peripherally disposed in alignment symmetrically about said armature and closely spaced from said first slots axially of said armature, providing a pair of second diametrically opposed narrow bands of metal between the ends of said second slots, the center line of said first slots and the center line of said second slots each being in a plane substantially normal to the axis of said armature, said second slots being staggered with respect to said first slots so that said first bands are positioned adjacent said second slots and said second bands are positioned adjacent said first slots, the slotted portion of said armature forming a resilient connection between the end portions of said armature, a first pair of pins each positioned adjacent the respective second slots on one side thereof, a second pair of pins each positioned on the opposite side of said second slots on the respective first bands of metal and in axial alignment with the adjacent first pins, a first strain wire mounted in tension on one pair of adjacent first and second pins across a second slot, a second strain wire mounted in tension on the second pair of adjacent first and second pins across the other of said second slots, and a force collector connected to an end of said strain column for application of an axial force to said strain column.

11. A transducer as defined in claim 10, wherein said first slots each comprises enlarged end portions and an intermediate narrow portion, and said second slots each comprises bulbous end portions and an intermediate narrow portion, said strain wires being disposed across the narrow portions of said second slots.

12. A transducer as defined in claim 10, including a case disposed about said strain column, said armature and its associated structure, a rigid connection between one end of said strain column and said case, said force collector being connected to the other end of said strain column.

13. A transducer as defined in claim 10, including a force collector connected to each end of said strain column.

14. A transducer which comprises an elongated strain member, an armature rigidly connected to said strain member at spaced points axially of said member, said armature between said spaced points being spaced radially of said elongated member, said armature having a slotted portion including a slot located between said spaced points in a plane substantially normal to the longitudinal axis of said armature, said slotted portion of said armature facilitating axial displacement of said armature on axial motion of said strain member, spaced wire connections on said armature on opposite sides of the slotted portion of said armature, an electrical resistance strain wire connected to said wire connections, and a force collector connected to said strain member.

15. A transducer which comprises an armature, an elongated strain member positioned about said armature, said armature being rigidly connected to said strain member at spaced points axially of said strain member, said armature between said spaced points being spaced radially of said strain member, said armature having a slotted portion including a slot between said spaced points of connection, the center line of said slot being located in a plane substantially normal to the longitudinal axis of said armature, said slotted portion of said armature facilitating axial displacement of said armature on axial motion of said strain member, spaced wire connections on said armature disposed on opposite sides of the slotted portion of said armature, an electrical resistance strain wire connected to said wire connections, and a force collector connected to said strain member.

16. A transducer which comprises an armature, an elongated strain tube positioned about said armature, said armature being rigidly connected to said strain tube at spaced points axially of said strain tube, said armature between said spaced points being spaced radially of said strain tube, said armature having a slotted portion including a slot between said spaced points of connection, the center line of said slot being located in a plane substantially normal to the longitudinal axis of said armature, said slotted portion of said armature facilitating axial displacement of said armature on axial motion of said strain tube, spaced wire connections on said armature disposed on opposite sides of the slotted portion of said armature, an electrical resistance strain wire connected to said wire connections, and a force collector connected to one end of said strain tube.

17. A transducer which comprises an armature, an elongated slotted strain tube positioned about said armature, said armature being rigidly connected to said strain tube at opposite ends axially of said strain tube, said armature between said spaced points being spaced radially of said strain tube, said armature having a slotted portion including a slot between said spaced points of connection, the center line of said slot being located in a plane substantially normal to the longitudinal axis of said armature, said slotted portion of said armature facilitating axial displacement of said armature on axial motion of said strain tube, spaced wire connections on said armature disposed on opposite sides of the slotted portion of said armature axially thereof, an electrical resistance strain wire connected to said wire connections, and a force collector connected to said strain tube.

18. A transducer which comprises an armature in the form of a flat bar, an elongated strain tube positioned about said armature, said armature being connected to said strain tube at spaced points axially of said strain tube, said armature between said spaced points being spaced radially of said strain tube, said armature having a slotted portion including a slot between said spaced points of connection, the center line of said slot being located in a plane substantially normal to the longitudinal axis of said armature, said slotted portion of said armature facilitating axial displacement of said armature on axial motion of said strain tube, spaced wire connections on said armature disposed on opposite sides of the slotted portion of said armature, an electrical resistance strain wire connected to said wire connections, and a force collector connected to one end of said strain tube.

19. A transducer which comprises an armature in the form of a flat metal bar, flanges connected to opposite ends of said armature, an elongated strain tube positioned about said armature, the ends of said strain tube being rigidly connected to said flanges, said strain tube being longitudinally slotted for access to said armature, said armature between said flanges being spaced radially of said strain tube, said armature having a slotted portion including a central slot intermediate the ends of said armature, said slot having an enlarged aperture at opposite ends thereof forming a thin metal bridge across said slotted portion of said armature on opposite sides of said armature, the center line of said central slot being located substantially normal to the longitudinal axis of said armature, said slotted portion of said armature facilitating axial displacement of said armature on axial motion of said strain tube, pins on said armature disposed on opposite sides of said central slot substantially along the longitudinal axis of said armature, electrical resistance strain wires connected to said pins, and a force collector connected to one of said flanges.

20. A transducer comprising an integral continuous strain member, an armature, and means for applying a force to said strain member along an axis thereof, said armature being rigidly connected to said strain member at two points spaced along the direction of said axis, said armature having a slotted portion intermediate said two points including an elongate slot extending transversely to said axis, said transducer further comprising two spaced wire connection elements mounted on said armature on opposite sides of said slotted portion, and an electrical resistance strain wire connected to said wire connection elements, whereby upon variation in the degree of axial force applied to said strain member in response to said force means said armature correspondingly expands and contracts in relation thereto along said axis to vary the spacing between said two points accordingly and thereby to correspondingly vary the tension on said strain wire.

References Cited in the file of this patent
UNITED STATES PATENTS

| | | |
|---|---|---|
| 2,835,774 | Statham | May 20, 1958 |
| 2,855,779 | Zaip | Oct. 14, 1958 |
| 2,920,299 | Lent | Jan. 5, 1960 |